(12) United States Patent
Levenson et al.

(10) Patent No.: US 9,003,890 B2
(45) Date of Patent: Apr. 14, 2015

(54) SPIRAL CONCENTRICALLY WOUND BOURDON TUBE

(71) Applicant: Tiro Technologies, LLC, Verdi, NV (US)

(72) Inventors: Michael Riley Levenson, Plymouth, MA (US); Gavin Chandler, Reno, NV (US)

(73) Assignee: Tiro Technologies, LLC, Verdi, NV (US)

( * ) Notice: Subject to any disclaimer, the term of this patent is extended or adjusted under 35 U.S.C. 154(b) by 0 days.

(21) Appl. No.: 14/298,498

(22) Filed: Jun. 6, 2014

(65) Prior Publication Data

US 2014/0360278 A1    Dec. 11, 2014

Related U.S. Application Data

(60) Provisional application No. 61/832,146, filed on Jun. 6, 2013.

(51) Int. Cl.
*G01L 7/04*    (2006.01)

(52) U.S. Cl.
CPC ..................... *G01L 7/041* (2013.01)

(58) Field of Classification Search
None
See application file for complete search history.

(56) References Cited

U.S. PATENT DOCUMENTS

| | | | |
|---|---|---|---|
| 3,805,619 A | 4/1974 | Wunderlich | |
| 4,136,560 A * | 1/1979 | Gellos | 73/146.8 |
| 4,143,545 A | 3/1979 | Sitabkhan | |
| 4,248,080 A | 2/1981 | Chuck | |
| 4,413,525 A | 11/1983 | Conti | |
| 4,502,336 A | 3/1985 | Dudash et al. | |
| 4,542,654 A | 9/1985 | Wilson et al. | |
| 4,773,271 A | 9/1988 | Mutou et al. | |
| 4,838,090 A | 6/1989 | Hestich | |
| 4,924,697 A | 5/1990 | Hunt et al. | |
| 5,363,703 A * | 11/1994 | Delatorre | 73/733 |
| 5,952,579 A | 9/1999 | DeFrancesco et al. | |
| 6,044,712 A | 4/2000 | Cannet et al. | |
| 6,604,428 B1 | 8/2003 | Tang | |
| 6,843,115 B2 | 1/2005 | Rutherford | |
| 7,237,439 B1 | 7/2007 | Rutherford et al. | |
| 7,284,419 B2 | 10/2007 | Rutherford | |
| 7,389,685 B2 | 6/2008 | Kosht et al. | |
| 7,509,849 B2 | 3/2009 | Rutherford et al. | |
| 7,555,959 B2 | 7/2009 | Miyasaka | |
| 7,574,920 B2 | 8/2009 | Rutherford et al. | |
| 7,730,787 B2 | 6/2010 | Miyasaka | |
| 8,156,818 B2 | 4/2012 | Miyasaka | |
| 8,424,389 B2 | 4/2013 | Newman et al. | |
| 2009/0206830 A1 * | 8/2009 | Kim et al. | 324/220 |
| 2010/0083731 A1 * | 4/2010 | Hedtke | 73/1.57 |
| 2012/0247791 A1 | 10/2012 | Kuczek et al. | |
| 2013/0139565 A1 * | 6/2013 | Hedtke | 73/1.57 |

OTHER PUBLICATIONS

Notification of Transmittal of Search Report dated Oct. 2, 2014 received in International application No. PCT/US14/41375.

* cited by examiner

*Primary Examiner* — Andre Allen
(74) *Attorney, Agent, or Firm* — Smith, Gambrell & Russell, LLP

(57) ABSTRACT

In one embodiment, the present invention provides a pressure sensor that provides improved reliability, reduced cost, and improved performance over currently available pressure sensor designs. The pressure sensor may include a spiral concentrically wound tube coil having a sealed end and an open end, wherein the stem or open end of the tube is oriented so as to be parallel with a plane of the coil windings. In one embodiment, the spiral concentrically wound tube coil may be a Bourdon tube.

19 Claims, 8 Drawing Sheets

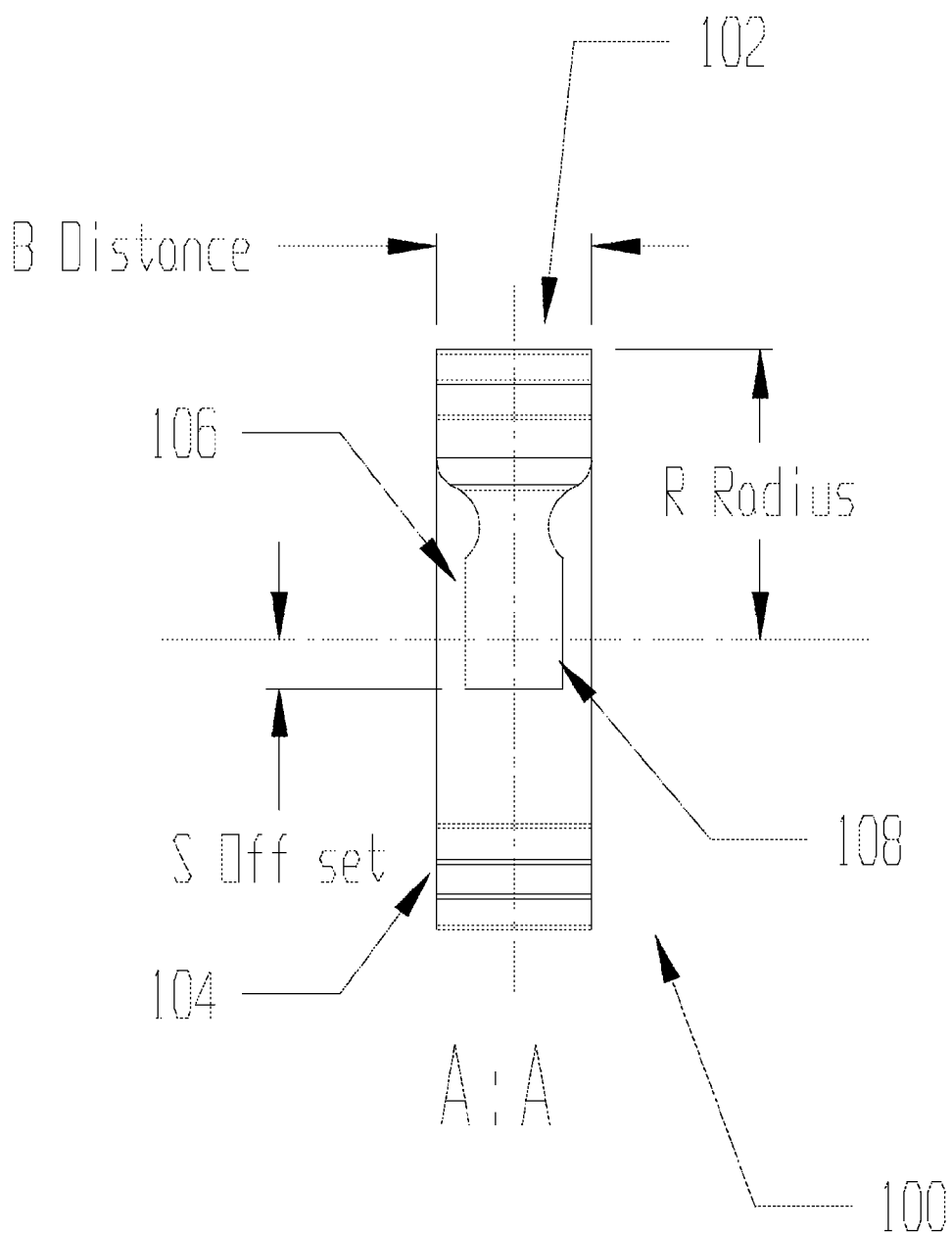

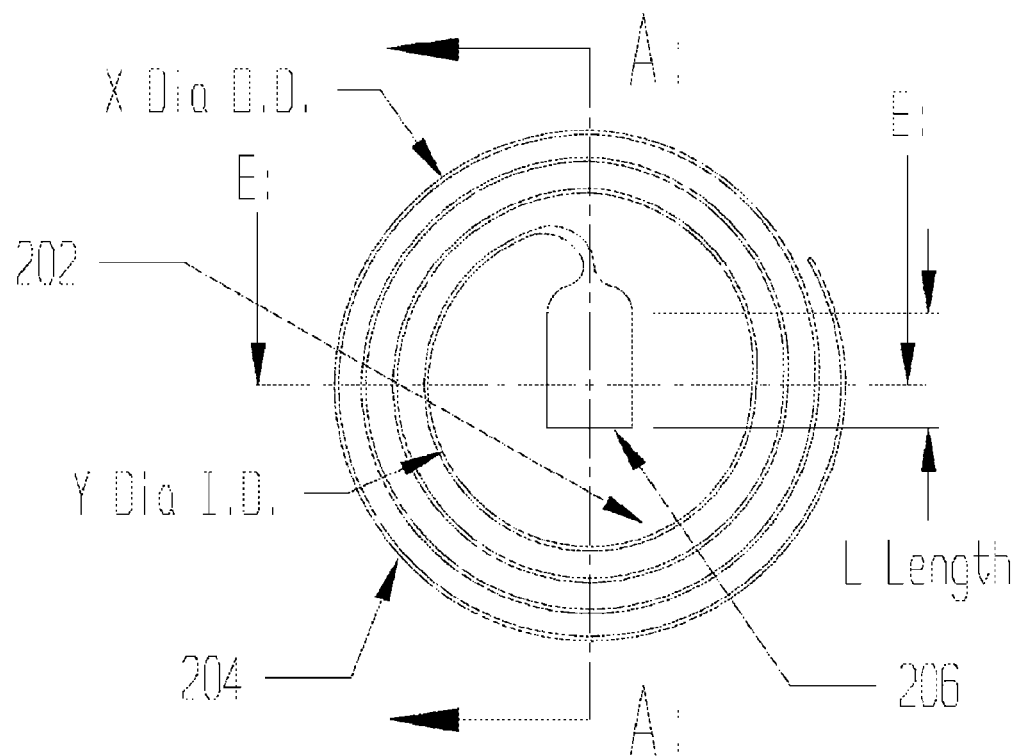
Figure Two (2)
Top View

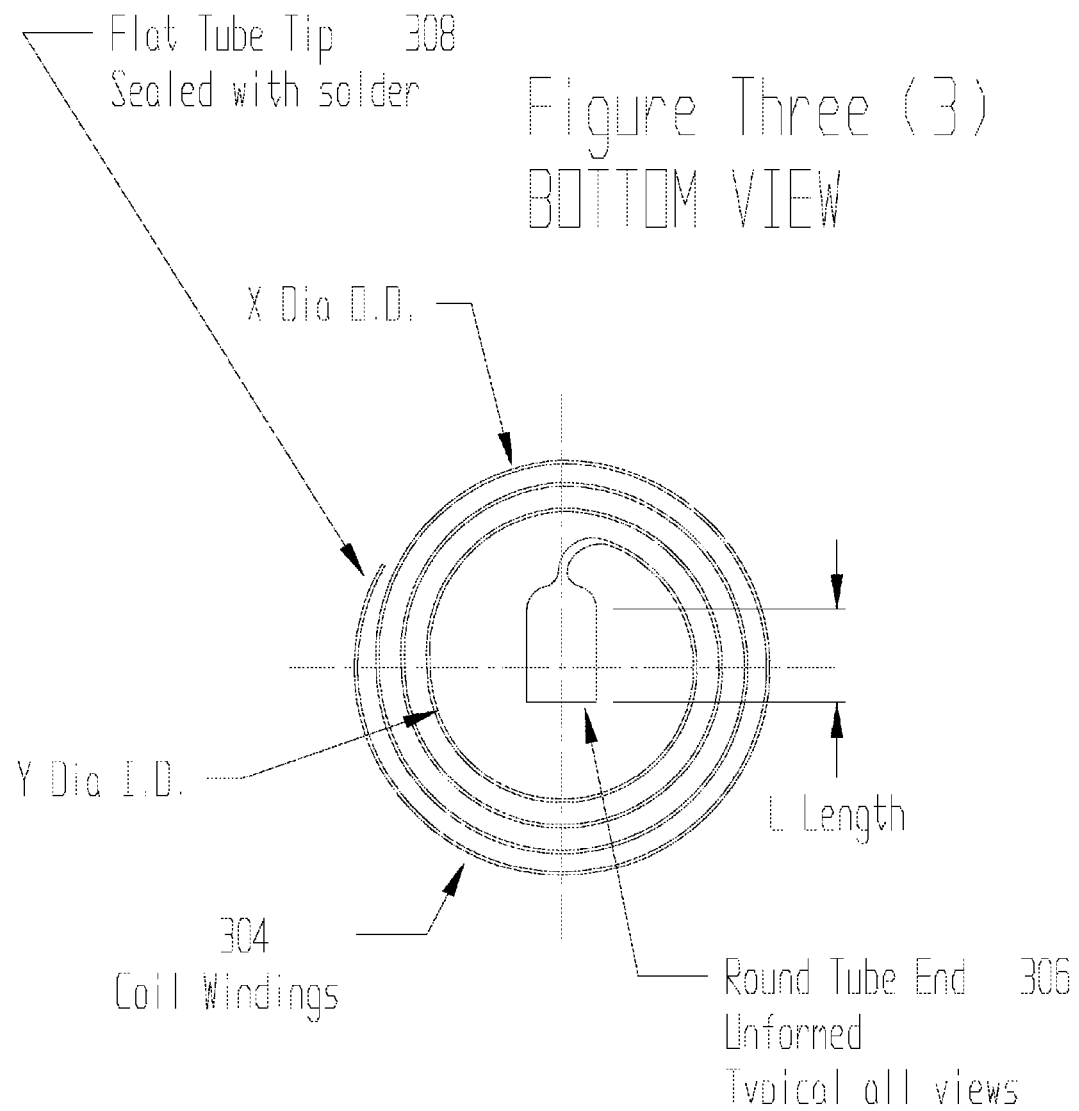

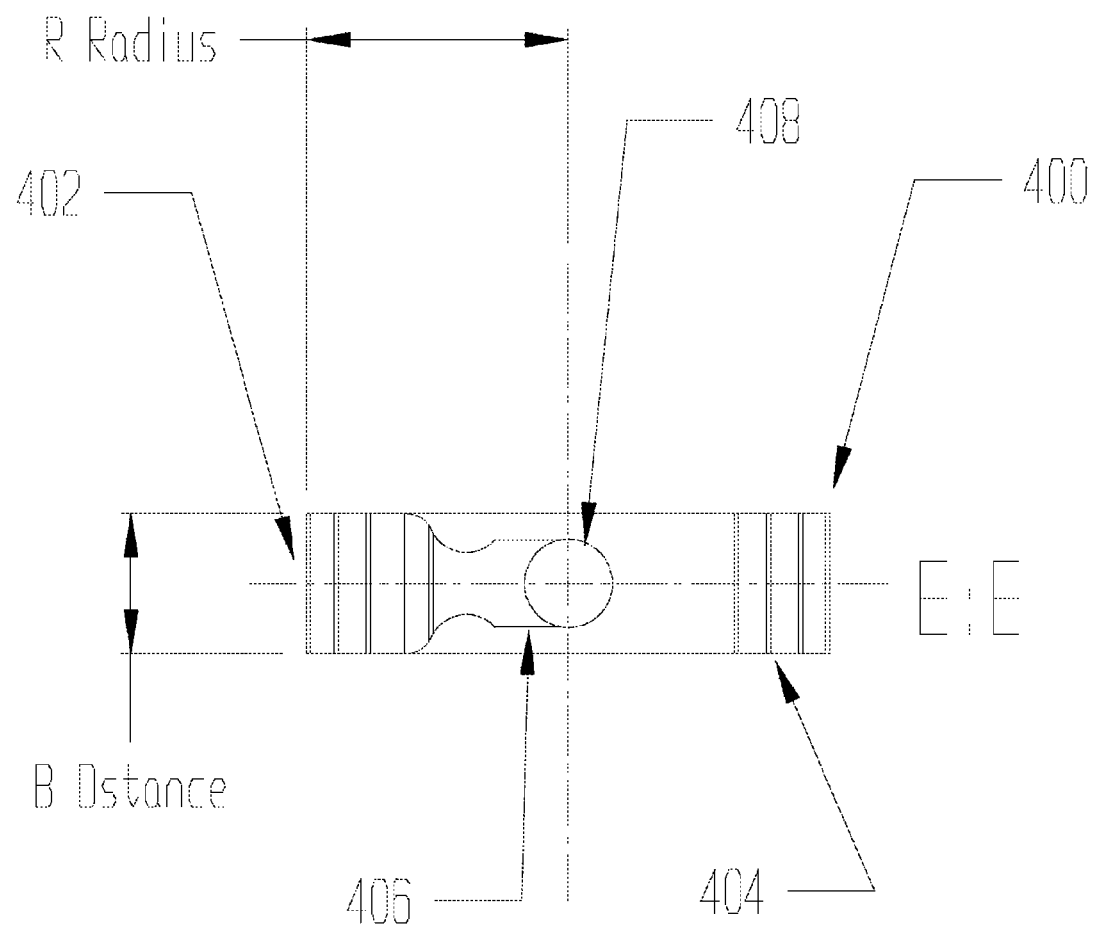

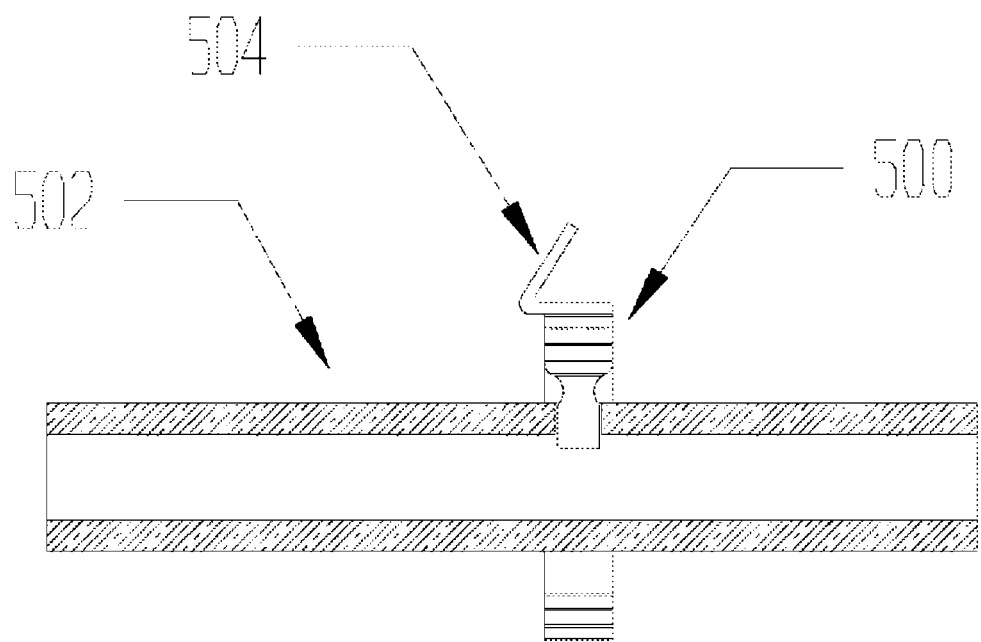
Figure five (5)

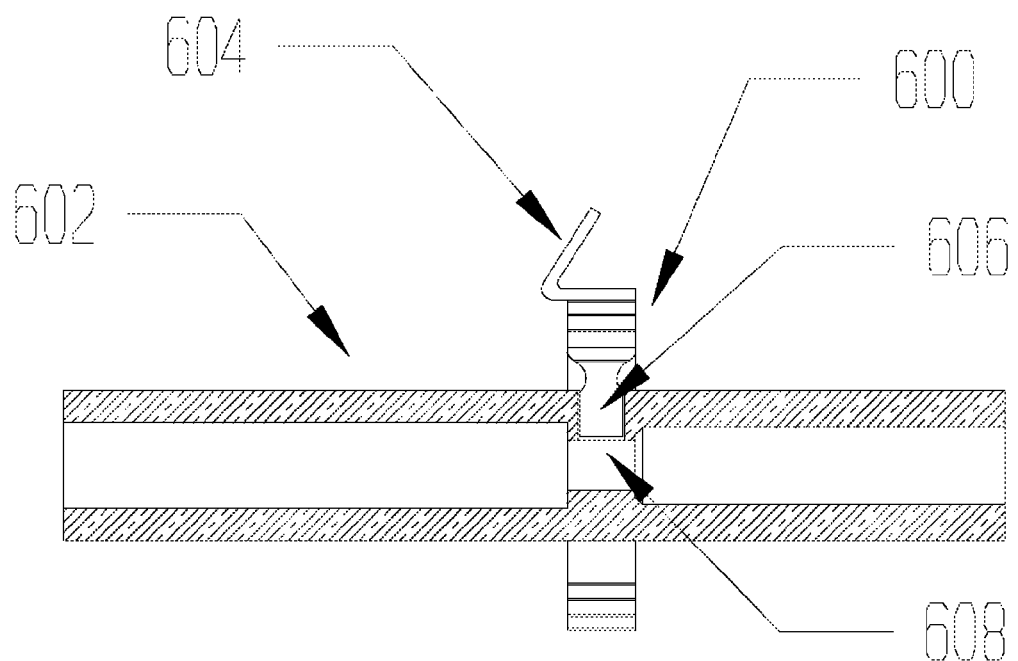
Figure six (6)

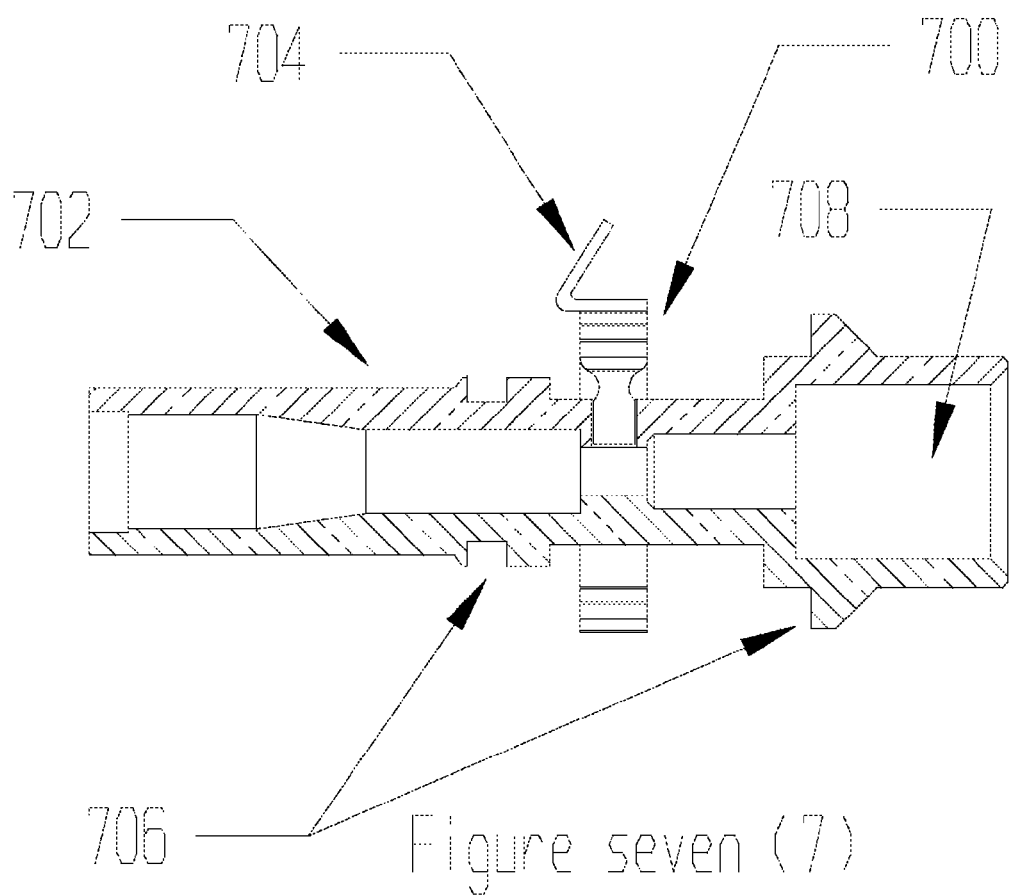
Figure seven (7)

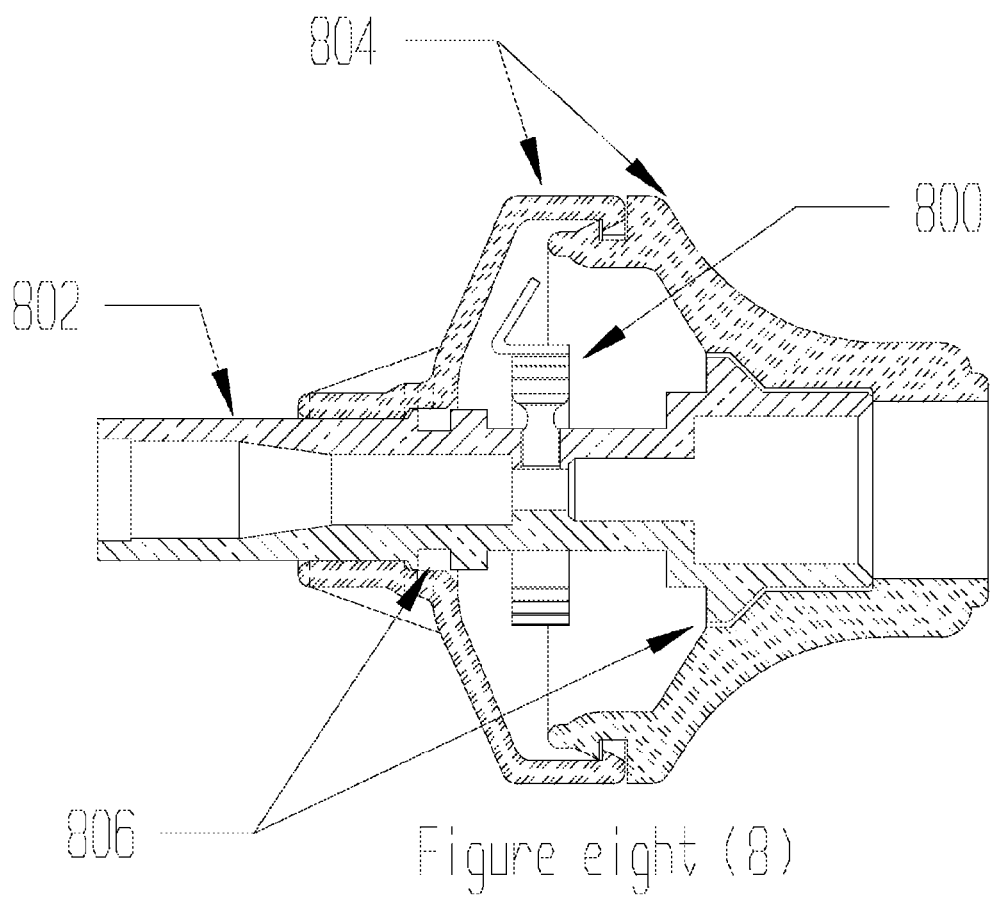
Figure eight (8)

SPIRAL CONCENTRICALLY WOUND BOURDON TUBE

CROSS-REFERENCE TO RELATED APPLICATIONS

This application claims the benefit of Provisional Application No. 61/832,146, filed Jun. 6, 2013, the contents of which are incorporated herein in their entirety.

BACKGROUND OF THE INVENTION

1. Field of Invention

The present invention relates to a spiral concentrically wound Bourdon tube. Specifically, the present invention relates to a spiral concentrically wound Bourdon tube having the post area parallel to the coil area and the complete design is all on the same plane.

2. Background of the Invention

The industry standard version of a spiral concentrically wound Bourdon tube would have a 90-degree bend on the rounded stem area that would be called the perpendicular post area of the coil. While conventional spiral concentrically wound Bourdon tubes are easily mounted on the closed end of a core, pipe, or other pressure vessel to create a pressure gauge, such that the post or stem is perpendicular to the Bourdon tube coil plane, the assembly has disadvantages when the gauge must function in extreme conditions such as those found in automotive environments, for example on a tire valve stem. Such disadvantages include limitations as to the orientation of the gauge dial or Bourdon tube coil plane relative to the pressure vessel and fluid flow path, the propensity for such Bourdon tubes and their gauge assemblies to leak or become damaged when exposed to rotational forces and other forces or environmental conditions, and the difficulty in creating gauges with flow-through functionality without exacerbating these disadvantages or increasing the cost of such gauges.

Bourdon tubes are a frequently used technology for measuring fluid pressure, relative to ambient or atmospheric pressure. In practice, a Bourdon tube pressure gauge is comprised of a flattened thin-wall, closed-end tube with the open hollow end connected to a fixed pipe or vessel containing the fluid pressure to be measured. The closed end of the Bourdon tube may be connected to a lever (indirect drive) or not (direct drive). Pressure changes in the pipe or vessel are transmitted to the Bourdon tube, which then changes its shape in a predictable way, allowing for pressure to be measured by the movement of the Bourdon tube in response to pressure changes in the Bourdon tube. Bourdon tubes are currently available in 3 basic designs: C-tube, concentric with perpendicular post, and helical. A C-tube is named after its shape where the tube is wound or curved through less than 360 degrees of arc. A concentrically wound Bourdon tube with a perpendicular post is one where the flattened tube is wound concentrically around the unsealed end which is bent and oriented such that the post is perpendicular to the plane of the concentric Bourdon tube coil windings. A helical tube is named after the helical shape that the tube is wound in.

C-tubes are generally used for high-pressure applications greater than 500 pounds per square inch (PSI). They also are generally too large to be used for gauges that are mounted on tires, or other applications where a small, light gauge is needed. Helical Bourdon tubes also cannot be used in a gauge small enough to use in valve stem-mounted tire gauges. Concentric perpendicular post Bourdon tubes are generally smaller and lighter than C-tubes, and more suited to low-pressure (<500 PSI) applications, but are difficult to use in flow-through gauges without adding significant expense and weight in the form of extra parts to provide for flow-through gauge functionality, and are not rugged enough to withstand the extreme conditions endemic to certain automotive environments. Additionally, in order to make a gauge that will face out from a wheel to facilitate reading the gauge, a different concentric perpendicular post Bourdon tube must be made for each side of the vehicle in order to prevent wheel rotation from unwinding the tube, one that is wound clockwise, and one that is wound counter-clockwise, adding additional costs to the manufacturing of such gauges.

SUMMARY OF THE INVENTION

In one embodiment, the present invention provides a pressure sensor that provides improved reliability, reduced cost, and improved performance over currently available designs in certain applications. The pressure sensor may include a spiral concentrically wound tube coil having a sealed end and an open end, wherein the stem or open end of the tube is oriented so as to be parallel with a plane of the coil windings. In one embodiment, the spiral concentrically wound tube coil may be a Bourdon tube. However, the present invention is not limited to Bourdon tubes, and contemplates pressure sensors including any type of tube coil. In the description below, for simplicity, the Bourdon tube is used as an example of a pressure sensor. However, the described examples are not limited to Bourdon tubes, but rather are applicable to any type of tube coil.

In one embodiment, the present invention includes a new Bourdon tube design that utilizes a flattened tube concentrically wound around a post that is oriented parallel to the plane of the spiral concentric tube windings (the "coil").

In one embodiment, the present invention provides a platform for new pressure gage designs and applications for which conventional Bourdon tube designs are unsuited. For example, in one embodiment, the present invention will allow for direct drive, flow-through pressure gages that will function reliably in various types of extreme environments. In one embodiment of the invention, a concentrically wound Bourdon tube with a parallel, in-plane post can be used to create a direct drive tire pressure gauge that can function reliably while mounted on or integrated with a tire's valve stem.

Conventional Bourdon tubes designs are unsuited for the tire gauge example described above for several reasons. A direct drive, flow-through pressure gauge suitable for automotive applications and other extreme environments may provide the following features:

1. The device may provide a flow-through feature that is reliable and not prone to leaks.
2. The device may withstand extreme dynamic force fields and other conditions such as variations in temperature, moisture, and humidity, and exposure to various chemicals common to automotive environments.
3. Inexpensive relative to the tires they are mounted on.
4. The device may be small and lightweight In one embodiment, the present invention provides a Bourdon tube design that is suitable for the extreme conditions that a pressure gauge will need to operate in when mounted on a wheel or used in other automotive applications, while also allowing for a simple, small, light-weight, and inexpensive flow-through gauge design.

In one embodiment, the present invention also provides a general design for the pipe or other vessel that the spiral concentrically wound Bourdon tube may be connected to in order to provide for pressure gauges with flow-through functionality where the fluid flow is perpendicular to the coil plane and where the core, pipe, or other pressure vessel may be located at or near the center of the coil.

Examples of embodiments of the present invention may include a pressure sensor comprising a spiral concentrically wound tube coil having a sealed end and an open end, wherein the stem or open end of the tube is oriented so as to be parallel with a plane of the coil windings. The spiral concentrically wound tube coil may be a Bourdon tube. The tube stem may be oriented near the center of a circular shape created by the coil windings. The minimum number of coil windings may be 3. The open end of the tube may be oriented towards the center of the coil when viewed from a position perpendicular to the plane of the coil windings. The stem of the tube is parallel to and in the same plane as the coil windings. The Bourdon tube coil may be made from Beryllium Copper, Stainless Steel, or other metal alloys. A pointer is mounted on the sealed end of the Bourdon tube. The sealed end of the Bourdon tube is used as a pointer, or is fashioned into a pointer. The maximum outside diameter of the Bourdon tube coil is 3 inches. The maximum tube diameter of the Bourdon tube is 0.5 inches. The maximum wall thickness of the Bourdon tube is 0.15 mm. The Bourdon tube is connected to a core, pipe, or other pressure vessel that contains the fluid for which a pressure measurement is desired, and where such a vessel can communicate, transmit, or transfer the pressure of the fluid to the Bourdon tube. The operating pressure for the Bourdon tube is 0-500 PSI. The core, pipe, or other pressure vessel is made of metal, metal alloy, plastic, carbon fiber, carbon nanotubes, composites, glass, or ceramics, or any combination thereof. The Bourdon tube is connected to the core, pipe, or other pressure vessel by adhesives, solders, or welding. The core, pipe, or other pressure vessel has threads on an open end that allows for the core, pipe, or other pressure vessel to be screwed onto or attached to another threaded core, pipe, or other pressure vessel. The core, pipe, or other pressure vessel is of a shape or has features that allow a housing made from metal, metal alloys, plastic, glass, ceramics, carbon fiber, carbon, nanotubes, composites, or combinations thereof to be mounted on the core, pipe, or pressure vessel wherein such housing may enclose and protect the Bourdon tube and will have a dial or other markings or be fashioned such that it can interact with the Bourdon tube pointer to indicate pressure. The pipe is a tire valve stem.

BRIEF DESCRIPTION OF THE DRAWINGS

The details of the present invention, both as to its structure and operation, can best be understood by referring to the accompanying drawings, in which like reference numbers and designations refer to like elements.

FIG. 1 is an exemplary side view, as if it were cut down centerline A of FIG. 2, of a spiral concentrically wound Bourdon tube according to an embodiment of the present invention.

FIG. 2 is an exemplary top view of a spiral concentrically wound Bourdon tube according to an embodiment of the present invention.

FIG. 3 is an exemplary bottom view of a spiral concentrically wound Bourdon tube according to an embodiment of the present invention.

FIG. 4 is an exemplary side view, as if it were cut down centerline E of FIG. 2, of a spiral concentrically wound Bourdon tube according to an embodiment of the present invention.

FIG. 5 is an exemplary cross sectional view of a spiral concentrically wound Bourdon tube attached to a pipe.

FIG. 6 is an exemplary cross sectional view of a spiral concentrically wound Bourdon tube attached to a pipe with a backstop in the pipe that correctly positions the stem of the Bourdon tube.

FIG. 7 is an exemplary cross sectional view of a spiral concentrically wound Bourdon tube attached to a pipe that has features that a housing may be attached to, and that also has threads that will allow the assembly to be screwed onto or attached to another part with compatible threads.

FIG. 8 is an exemplary cross sectional view of a spiral concentrically wound Bourdon tube attached to a pipe as in FIG. 7 with a housing attached to the pipe features shown in FIG. 7.

DETAILED DESCRIPTION OF INVENTION

A spiral concentrically wound bourdon tube according to one embodiment of the present invention has the post area that is parallel to the coil area and the complete spiral concentrically wound bourdon tube is all on the same plane. The configuration of the spiral concentrically wound bourdon tube on a single plane allows for a fluid to flow through the gauge on a path that is perpendicular to the plane of the Bourdon tube coil, and provides for the pipe or pressure vessel to be located in the center of the tube windings, while also allowing the fluid to be able to pass the inlet port of the Bourdon tube coil. Additionally, a single Bourdon tube coil may be used for both clockwise and counter-clockwise windings by simply reversing the side of the coil plane that faces out towards a viewer. In an embodiment of the invention, the spiral concentrically wound bourdon tube is implemented in an analogue style gauge that includes a threaded base that allows for screw-on mounting on any threaded pipe. In another embodiment of the invention, the spiral concentrically wound Bourdon tube is implemented so as to be integrated with the pipe. In an embodiment of the invention, the analogue style gauge is used for tire pressure monitoring ("TPM").

As shown in FIGS. 1-8, a spiral concentrically wound Bourdon tube has a round tube end (also referred to as the stem or post area) that is connected to a center core, pipe, or other pressure vessel. FIG. 1 depicts a cross section of a spiral concentrically wound Bourdon tube 100 with a flattened tube dimension of Distance B, a Radius R, and an inlet port 108 with offset S, that includes outer coil windings 102 that are adjacent to the outside diameter of the coil, inner coil windings 104 that are adjacent to the inside diameter of the coil, a round inner stem or post area 106 (e.g., unformed tip), and inlet port 108. The outer coil winding 102 and inner coil winding 104 are shown in a cross section of the coil as if it were to be cut down the center line A-A of FIG. 2. The spiral concentrically wound Bourdon tube 100 may be made from materials including, but not limited to, BeCu (Beryllium Copper), Stainless steel series 300, 400, 500, 700, heat treatable, cold work hardened, and/or annealed compounds. The stem 106 provides fluid flow to the rest of the tube from the inlet port 108. In an embodiment of the invention, the stem is the area of unformed tube used as the Bourdon tube attachment area to the core, pipe, or other pressure vessel where the stem may be attached using solders, adhesives, or welding. In an embodiment of the invention, the stem 106 is parallel to the plane of the coil windings, and in another embodiment is both parallel to and in the same plane as the coil windings. In the embodiment of the invention where the stem is both parallel to and in the same plane as the coil windings, a single coil can provide clockwise or counter-clockwise coil windings by inverting or flipping the coil relative to one end of the core, pipe, or pressure vessel, or by viewing the coil from the top (FIG. 2) or bottom (FIG. 3). This will result in a single coil design that may be used to make gauges for mounting on tires on either the left or right side of a vehicle, and eliminating the need for two different coils that are a mirror image of each other to meet the same manufacturing and gauge performance requirements.

FIG. 2 depicts a top view of a spiral concentrically wound Bourdon tube having a outer coil winding 204, an inner coil winding 202, an outside diameter X, an inside diameter Y, a stem length L, and a fluid inlet port 206. In an embodiment of the invention the coil winding is oriented in a clockwise direction. In an embodiment of the invention, the coil winding is oriented in a counter-clockwise direction. In an embodiment of the invention the same coil may provide either clockwise or counter-clockwise windings by reversing which side of the coil plane is oriented towards the viewer.

FIG. 3 depicts a bottom view of a spiral concentrically wound bourdon tube having a round stem 306, coil windings 304, and flat tube tip 308 that is sealed. In an embodiment of the invention the sealed flat tube tip 308 is used as an area to attach a pointer. In an embodiment of the invention the sealed flat tube tip 308 may be fashioned into a pointer.

FIG. 4 depicts a cross section of the coil as if it were to be cut down the center line E-E of FIG. 2, with an outer coil winding 402, an inner coil winding 404, a stem or post 406, and an inlet port 408.

FIG. 5 depicts a longitudinal cross section of a core, pipe, or other pressure vessel 502 with a spiral concentrically wound Bourdon tube 500 attached to it. The Figure also depicts an example of a pointer 504 mounted on the sealed end of the Bourdon tube 500.

FIG. 6 depicts the same assembly as shown in FIG. 5, with the Bourdon tube 600 attached to the core, pipe, or other pressure vessel 602, and the attached pointer 604, with the addition of a backstop or other feature of the core, pipe, or other pressure vessel 608, that is used to correctly position the Bourdon tube stem or post 606 for attachment.

FIG. 7 depicts a longitudinal cross section of a Bourdon tube 700 mounted on a core, pipe, or other pressure vessel 702 that has a shape or other additional features 706 that may be used to attach a housing or other enclosure or device that may enclose and protect the Bourdon tube 700, and/or may serve to interact with the Bourdon tube pointer 704 to indicate pressure. The figure also depicts the threaded areas 708 that allow the core, pipe, or other pressure vessel 702 to be screwed onto or attached to another device with compatible threads. In an embodiment of the invention the threads 708 are located at either end of the pipe and are either on the inside or outside of the pipe to create male and/or female threaded areas.

FIG. 8 depicts a longitudinal cross section of a Bourdon tube 800 mounted on a core, pipe, or other pressure vessel 802, with a housing 804 attached to the features 806 of the core 802.

One having ordinary skill in the art would recognize that the present invention is not limited to the dimensions specified in FIGS. 1-4 and that the dimensions of the tube wall thickness, length, inner diameters, and windings can be in a range so that the invention can be used in a product line from ranging from 5 psi up to 500 psi and that the dimensioned can be changed without departing from the scope and spirit of the invention. One having ordinary skill in the art would also recognize that the number coil windings can be modified to operate within a specific psi range (i.e., a 100 psi coil has x amount of windings, with a 130 psi coil having y amount of windings). One having ordinary skill in the art would also recognize that the shape of the pipe or pressure vessel or the features of the pipe or pressure vessel that allow attachment of a housing, enclosure, or other device for protecting the Bourdon tube or for interacting with or providing a fixed reference for the pointer may be changed to accommodate different gauge and housing shapes and sizes for different applications.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A pressure sensor comprising a spiral concentrically wound tube coil having a sealed end and a stem or an open end, wherein the stem or open end of the tube is oriented so as to be parallel with a plane of windings of the spiral concentrically wound tube coil.

2. The pressure sensor of claim 1, wherein the spiral concentrically wound tube coil is a Bourdon tube.

3. The pressure sensor according to claim 1 wherein the open end of the tube is oriented to face a center of a circle created by the coil windings.

4. The pressure sensor according to claim 1 wherein the minimum number of coil windings is 3.

5. The pressure sensor according to claim 1 wherein the open end of the tube is oriented towards a center of the coil when viewed from a position perpendicular to the plane of the coil windings.

6. The pressure sensor according to claim 1 wherein the open end or stem of the tube is parallel to and in the same plane as the coil windings.

7. The pressure sensor according to claim 1 wherein the coil is made from Beryllium Copper, Stainless Steel, or other metal alloys.

8. The pressure sensor according to claim 1 wherein a pointer is mounted on the sealed end of the tube.

9. The pressure sensor according to claim 1 wherein the sealed end of the tube is used as a pointer, or is fashioned into a pointer.

10. The pressure sensor according to claim 1 wherein the maximum outer diameter of the tube coil is 3 inches.

11. The pressure sensor according to claim 1 wherein the maximum tube diameter is 0.5 inches.

12. The pressure sensor according to claim 1 wherein the maximum wall thickness of the tube is 0.15 mm.

13. The pressure sensor according to claim 1 wherein the tube is connected to a core, pipe, or other pressure vessel that contains a fluid for which a pressure measurement is desired.

14. The pressure sensor according to claim 1 wherein an operating pressure for the tube is 0-500 PSI.

15. The pressure sensor according to claim 13 wherein the core, pipe, or other pressure vessel is made of metal, metal alloy, plastic, carbon fiber, carbon nanotubes, composites, glass, ceramics, or any combination thereof.

16. The pressure sensor according to claim 13 wherein the tube is connected to the core, pipe, or other pressure vessel by adhesives, solders, or welding.

17. The pressure sensor according to claim 13 wherein the pressure sensor has threads on an open end that allows for the assembly to be screwed on to another threaded core, pipe, or other pressure vessel.

18. The pressure sensor according to claim 13 wherein the core, pipe, or other pressure vessel is of a shape or has features that allow a housing, enclosure, or indicator made from metal, metal alloys, plastic, glass, ceramics, carbon fiber, carbon, nanotubes, composites, or combinations thereof to be mounted on the core, pipe, or pressure vessel wherein such housing or enclosure will enclose and protect the Bourdon tube and will have a dial or other markings that can interact with the tube pointer to indicate pressure, or where the indicator can interact with the tube pointer to indicate pressure.

19. The pressure sensor according to claim 13 wherein the pipe is a tire valve stem.

\* \* \* \* \*